RICHARD T. GALLOWAY
*INVENTOR.*

3,267,417
NAVIGATION OF MARKED CHANNELS
Richard T. Galloway, Panama City, Fla., assignor to the United States of America as represented by the Secretary of the Navy
Filed Mar. 24, 1964, Ser. No. 354,480
5 Claims. (Cl. 340—3)

The invention described herein may be manufactured and used by or for the Government of the United States of America for governmental purposes without the payment of any royalties thereon or therefor.

The present invention relates to navigation in a seaway and more particularly to a method and a navigational aid system with which a ship can be steered along a desired track or narrow lane including paths extending through mined areas.

The navigation of narrow channels whether natural or man made is always hazardous and the position of a ship in the channel is difficult to determine with accuracy from the usual channel markings which usually deteriorate in usefulness at times of poor visibility. It is desirable at all times and almost necessary in times of war that a channel in friendly waters can be safely navigated under all conditions of visibility and preferably by means which do not readily betray the channel to an enemy.

An object of the invention is to improve the preciseness of navigation by increasing the accuracy with which a ship may be steered along a desired track.

Another object of the invention is to provide an underwater channel defining system which cooperates with shipborne apparatus to make available to the steersman substantially constant and current information of the ship's position with respect to the center of a channel.

Another object of the invention is to provide a channel navigation system whose components, external to the ship being navigated, lie substantially on the water bottom and constitute no obstacle but rather a valuable aid to minesweeping operations if such becomes necessary.

In accordance with a preferred form of the present invention, a channel having a plurality of markers spaced along, or a known distance from, the center line of the channel is navigated by determining the range difference between two markers immediately forward of a ship from each of two points spaced athwartship and steering the ship to maintain these two range differences equal if the markers lie on the center of the channel. A desired course spaced laterally from the line of the markers is followed by maintaining a corresponding inequality between the two measured range differences. In practicing the preferred form of the invention the channel markers comprise sonic transponders approximately equally spaced, say a few hundred yards, and adapted to transmit an acoustic pulse when interrogated by a pulse from a forwardly directed transponder mounted on the center line of the ship. Two hydrophones mounted athwartship and symmetrically spaced from the ship's center line individually receive in succession the responses from the two transponders and through suitable instrumentation separately display the indicated range differences between the two transponders as viewed by each hydrophone. A helmsman by maintaining the separate displays in a preselected relation to each other can maintain his ship along the selected course represented by such preselected relation.

The invention itself as well as other objects and advantages thereof will be readily apparent from the following description when considered in connection with the accompanying drawing in which FIG. 1 is a block diagram of a display for indicating to the steersman the position of his ship in a channel;

Figure 2:
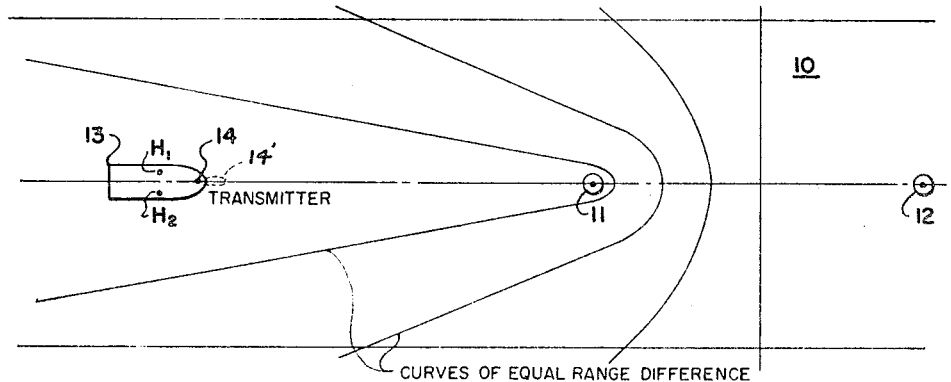
FIG. 2 shows a channel segment along which a ship is being navigated.
Figure 3:
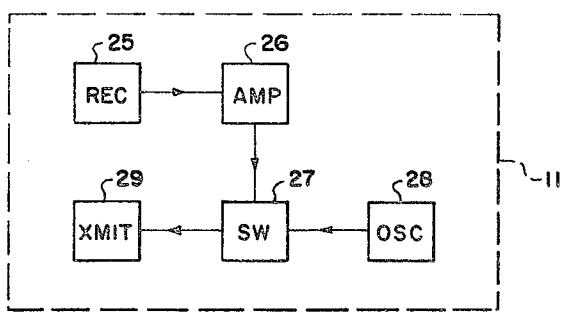
FIG. 3 illustrates a transponder suitable for defining the center line of a channel.

As illustrated in FIG. 2 a channel 10 has spaced along its center line a series of transponders, only two of which, 11 and 12, are here shown and is being navigated by a ship 13 provided with a transmitter transducer 14 having a forwardly directed directivity pattern 14' and two hydrophones $H_1$ and $H_2$ spaced athwartship and equally distant from the center line of the ship 13. The transmitting transducer 14 is forwardly directed so as not to interrogate any transponders which may have already been passed over, but rather is adapted for pulse exciting the two transponders immediately forward of the ship such as transponders 11 and 12 as shown in FIG. 2. One suitable circuit for these channel marking transponders 11 and 12 is shown in FIG. 3 as comprising a receiving transducer 25 having its output signal connected to a frequency selective amplifier 26 the output of which controls a switch 27 for connecting an oscillator 28 to a transmitting transducer 29 to emit an acoustic pulse preferably of the same length as the exciting or interrogating pulse transmitted by the forwardly directed transducer 14 and received by the transducer 25. The acoustic pulses emitted by the transponders 11 and 12 are received by the hydrophones $H_1$ and $H_2$ with the time interval between the receipt of the pulses being a function of the range difference between the respective transponders 11 and 12 as measured from the respective hydrophones $H_1$ and $H_2$. When the two range differences thus measured are equal, then except as noted below, it is known that the ship 13 is on the center line defined by the transponders 11 and 12.

Figure 1:
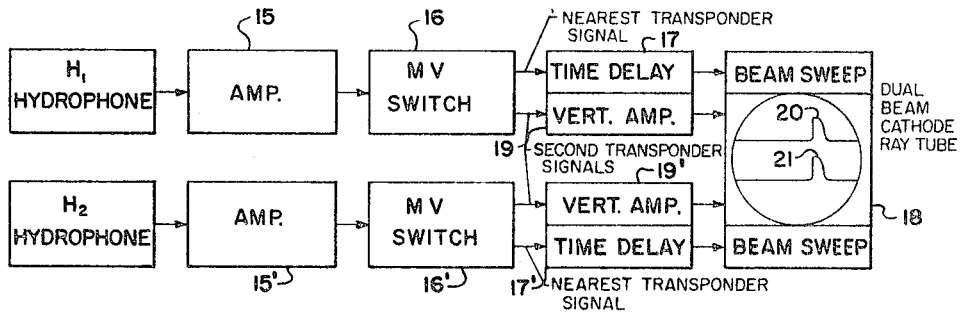

The transponder-emitted pulses received by the hydrophones $H_1$ and $H_2$ are processed into a suitable steering indication display, one preferred processing system being illustrated in FIG. 1. As is evident from FIG. 1, the two hydrophones $H_1$ and $H_2$ are connected through identical circuits to the horizontal and vertical deflecting circuits of a dual-beam cathode ray tube 18. The response of the hydrophone $H_1$ to a pulse received from the transponder 11 is passed through an amplifier 15, a monostable multivibrator 16, and a time delay circuit 17 to initiate a horizontal sweep of the upper beam of the tube 18. This first pulse in passing through the multivibrator 16 moves it to its unstable position so that the response of the hydrophone $H_1$ to the later arriving pulse signal from the distant transponder 12 is transmitted through the vertical amplifier 19 to the vertical deflecting circuit for the upper beam of the cathode ray tube 18 to produce the deflection 20. These same first and second pulse signals from the transponders 11 and 12 are also received by the hydrophone $H_2$ the responses of which are similarly processed through an amplifier 15', a monostable multivibrator 16', a time delay 17' and a vertical amplifier 19' to energize the horizontal and vertical deflecting circuits, respectively, for the lower beam of the cathode ray tube 18 to produce the deflection 21. The monostable multivibrators 16 and 16' have a dwell time in their unstable position which is slightly longer than the signal travel time through a distance equal to the spacing between the transponders 11 and 12 so as to insure that the pulse signal from the distant transponder will be transmitted to the vertical amplifiers 19 and 19', respectively. The time delays 17 and 17' are equal in length and are preferably chosen to be less than the signal travel time through a distance equal to the spacing between the transponders 11 and 12 so that the horizontal sweeps on the cathode ray tube 18 may be expanded to improve the accuracy of indication of the deflections 20 and 21. It will be evident that the horizontal positions of the vertical deflections 20 and 21 are individually representative of the difference in distance between the two transponders 11 and 12 from the hydrophones $H_1$ and $H_2$, respectively, and hence the positions of the two deflections 20 and 21 relative to each other are indicative of the transverse position of the ship 13 in the channel 10, i.e., with respect to the channel center line. When the two deflections 20 and 21 coincide in time, i.e., are vertically aligned, they indicate that the ship 13 is centered in the channel 10 as shown in FIG. 2. Such a center line indication would also be given if the line connecting the two hydrophones $H_1$ and $H_2$ coincides with one of the equal distance curves (other than the center line) shown in FIG. 2, but such ambiguity would ordinarily be resolved by knowledge of the approximate bearing along the channel 10. In the absence of knowledge of the general bearing of the channel 10 the addition of another complete display unit with its two hydrophones mounted in line with the ship's keel would remove any ambiguity because both displays would be matched only when the ship 13 is in the channel center.

It is obvious that increased sensitivity of the above described steering indicator can be obtained by increasing the speed of the horizontal sweep and periodically adjusting the time delays 17 and 17′ simultaneously to cause the pulse signals 20 and 21 to appear on the cathode ray tube 18. Since only the relative positions of the signals 20 and 21 with respect to one another are of interest, their position on the tube 18 is not important.

One advantage of the system is that the transponders 11, 12, etc., need not be equally spaced nor is it necessary to know their spacing inasmuch as the system operates on distance differences. In navigating the channel the steersman simply steers to maintain the vertical deflections 20 and 21 in vertical alinement as shown in FIG. 1. Any departure of the ship 13 to one side of the channel center would cause one of the deflections to lead while a departure to the other side of the channel center would cause the other deflection to lead thereby indicating to the steersman on which side of the channel center and relatively how far from the center his ship is located.

The effects of a ship severely crabbing or yawing along a channel such as might be caused by a strong cross current are to reduce the component of the distance between the hydrophones $H_1$ and $H_2$ perpendicular to the channel, to increase the distance of one hydrophone from the marker transponders and to decrease the distance of the other hydrophone from these markers. Inasmuch as the sensitivity of the present indicator varies directly with the component of the distance between the hydrophones perpendicular to the channel, severe crabbing will reduce the sensitivity, but as long as the point half way between the hydrophones is over the center line of the channel, zero deviation will be indicated on the display tube 18. Since it is the difference of the distances to the two markers 11 and 12 which is indicated, the increased and decreased distances of the hydrophones from the markers brought about by crabbing will have negligible effect.

While for the purpose of disclosing the invention a preferred embodiment thereof has been described in detail, it will be evident to those skilled in the art that modifications and variations thereof can be made without departing from the scope of the invention as set forth in the appended claims.

What is claimed is:
1. A shipborne steering indicator for aiding the navigation of a ship along a channel defined by submerged acoustic transponders spaced lengthwise along the center line of the channel comprising
   means for pulse exciting the two transponders defining the segment of the channel immediately forward of the ship,
   first and second hydrophones mounted athwartship and equally distant from the ship's center line for receiving pulses from said two transponders, and
   means individual to each of said hydrophones responsive to the time interval between the receipt of pulses from said two transponders for displaying said time intervals as an indication to the steersman of the position of the ship relative to the center line of the channel.

2. The steering indicator defined in claim 1 wherein the means for pulse exciting said two transponders comprises
   an underwater sound transmitter including
      a transducer having a forwardly directed directivity pattern whereby transponders which have been passed over will not be excited.

3. The steering indicator defined in claim 1 wherein said displaying means includes
   a dual beam cathode ray tube,
   horizontal and vertical deflecting circuits for each of the dual beams,
   circuit means operative upon the receipt of a first pulse by said first hydrophone to deflect in one direction as a function of time one of the dual beams and upon receipt of a second pulse to deflect in an orthogonal direction said one of the dual beams, and
   circuit means operative upon the receipt of a first pulse by said second hydrophone to deflect in said one direction as a function of time the other of the dual beams and upon receipt of a second pulse to deflect in said orthogonal direction said other of the dual beams.

4. The steering indicator defined in claim 3 wherein
   a monostable multivibrator switch in each of said circuit means is connected so that
      in its stable position it connects its associated hydrophone to the horizontal deflecting circuit for one of the dual beams and
      in its unstable position it connects its associated hydrophone to the vertical deflecting circuit for said one of the dual beams,
   said multivibrator switch being so arranged that it remains in its unstable position for an interval of time slightly greater than the time interval between the receipt of said first and second pulses.

5. In a system for indicating the position of a ship in a channel with respect to a line defined by underwater acoustic transponders which when pulse excited by sound waves individually transmit acoustic pulses, ship carried apparatus comprising
   sound wave pulsing means for exciting the two transponders defining the segment of the channel immediately forward of the ship, and
   position indicating apparatus including
      two receiver means equally spaced on opposite sides of the center line of the ship and responsive to acoustic pulses transmitted by said two transponders,
      means in each of said receiver means for providing a signal representative of the difference in range to said two transponders, and
      means for displaying for visual comparison the two range-difference signals as an indication of the position of the ship in the channel.

References Cited by the Examiner
UNITED STATES PATENTS

| | | | |
|---|---|---|---|
| 1,384,029 | 7/1921 | Fessenden | 340—6 X |
| 2,326,880 | 8/1943 | Norrman | 340—3 |
| 2,405,238 | 8/1946 | Seeley. | |
| 3,171,094 | 2/1965 | Geren et al. | 340—2 |

CHESTER L. JUSTUS, *Primary Examiner.*
R. A. FARLEY, *Assistant Examiner.*